UNITED STATES PATENT OFFICE.

DAVID M. BENFORD, OF NORTH PELHAM, NEW YORK.

PULLEY-FACE-FRICTIONING COMPOSITION.

1,383,692.     Specification of Letters Patent.     Patented July 5, 1921.

No Drawing.     Application filed February 21, 1920. Serial No. 360,461.

*To all whom it may concern:*

Be it known that I, DAVID M. BENFORD, a citizen of the United States, residing at North Pelham, in the county of Westchester and State of New York, have invented certain new and useful Improvements in Pulley-Face-Frictioning Compositions, of which the following is a specification.

My present invention relates to an improvement in a composition for increasing the traction between driver and driven members for power transmission. More specifically, my composition has found its greatest use for increasing the traction, and thereby decreasing the slippage, between pulleys and belts such as are commonly used in power transmission practice.

Another important advantage of my composition is the ease with which it may be applied to any pulley face, and another advantage lies in the tenacity with which it clings to the face of all materials, especially metal-face pulleys that have long been used and have received thereon a very highly-polished finish, which finish makes it difficult for most substances to become permanently attached thereto.

My composition is composed of a suitable fluid quick-drying oil-proof compound, together with a mixture of some finely pulverized material, preferably mineral, and from a great number of such I have selected sodium silicate, or water-glass, as the fluid-bonding member for the compound, and for the filler therefor I have selected pulverized glass or preferably water-floated ground glass.

I have found in practice that water-glass, on account of its well-known adhesive qualities after becoming fairly dry, will affix itself to highly polishing surfaces and after proper drying, is sufficiently unitary in structure to withstand the terrific friction action of a high speed, hard driving belt, and have found that ground glass makes the best base in conjunction therewith, and the two together, after having become dry, form a hard close-clinging coating on bright or highly polished surfaces, and of metal pulley driving faces more especially, and form a granular surface for providing friction and retaining oil particles, due to the presence of the pulverized glass or water floated ground glass in the composition, and the glass, from the fact that it has already been fused, being further adapted to resist fracture by the belt, and the heat generated thereby.

I have found in actual practice over extended periods of time that this composition will cling to pulley surfaces for periods as long as six to eight months without deterioration, and that if the pulley is wiped off every night with a clean dry rag, the excess oil is thereupon removed from the pulley, and that the continued use of this composition and the wiping of the pulley after use will gradually withdraw all the oil from an old belt having an excess of waste oil therein, and that eventually such belt becomes dry and pliable and performs its functions better than ever.

I have found by actual practice that there are not any particular proportions with which the sodium silicate and ground glass may be mixed, but on the score of ease of application, I have found that sufficient ground glass mixed with a sufficient amount of sodium silicate to make a free-flowing mixture similar to paint, thereby permitting it to be brushed on with an ordinary paint brush, is the most economical, cleanly and most satisfactory mode of application.

I have also found that this composition may be applied at night after the shutdown of the plant and the composition is sufficiently dry by morning to permit immediate use.

Having thus described my invention, what I claim is:

1. A pulley-face frictioning composition comprising water-floated ground glass; and a hard-drying liquid mixed therewith.

2. A pulley-face frictioning composition comprising a hard-drying liquid substance consisting entirely of water-floated ground glass; and water glass mixed therewith to form the free-flowing composition for application to the pulley-face; said water-floated ground glass, when the composition is dry on the pulley-face, forming sharp granular means adapted for providing friction.

3. A pulley-face frictioning composition consisting entirely of ground glass and a hard-drying liquid mixed therewith.

4. A pulley-face frictioning composition comprising a hard-drying liquid substance consisting entirely of ground glass entirely free of other solid material; and water glass mixed therewith to form the composition; said ground glass, when the composition is dry on the pulley-face, forming sharp granular means adapted for providing friction.

5. A pulley-face frictioning composition comprising a hard-drying, free-flowing liquid substance consisting of water-floated ground glass; and water glass mixed therewith in proportion to form a free-flowing composition adapted for application to the pulley-face by means of a brush or the like.

6. A pulley-face frictioning composition comprising a hard-drying, free-flowing liquid substance consisting of ground glass free of other solid material; and water glass mixed therewith in proper proportion to form the free-flowing composition adapted for application to the pulley-face by a brush or the like, said ground glass, when the composition is dry on the pulley-face, forming sharp granular means adapted for providing friction.

7. A pulley-face frictioning composition comprising a hard-drying liquid substance consisting of ground glass free of other solid material; and water glass mixed therewith to form the composition; said ground glass, when the composition is dry on the pulley-face, forming sharp granular means adapted for providing friction and for extracting oil particles from a belt.

8. A pulley-face frictioning composition comprising a hard-drying, free-flowing liquid substance consisting entirely of water-floated ground glass entirely free of other solid material; and water glass mixed therewith to form the free-flowing composition for application to the pulley-face; said water-floated ground-glass, when the composition is dry on the pulley-face, forming sharp granular means adapted for providing friction and for extracting oil particles.

DAVID M. BENFORD.

Witnesses:
W. L. BAKELAR,
H. D. PENNEY.